US011868355B2

(12) United States Patent
Thomas et al.

(10) Patent No.: US 11,868,355 B2
(45) Date of Patent: Jan. 9, 2024

(54) SYSTEM AND METHOD FOR PERSONALIZED RETRIEVAL OF ACADEMIC CONTENT IN A HIERARCHICAL MANNER

(71) Applicant: INDIAVIDUAL LEARNING PRIVATE LIMITED, Karnataka (IN)

(72) Inventors: Achint Thomas, Bangalore (IN); Keyur Faldu, Bangalore (IN); Aditi Avasthi, Bangalore (IN)

(73) Assignee: INDIAVIDUAL LEARNING PRIVATE LIMITED, Bangalore (IN)

( * ) Notice: Subject to any disclaimer, the term of this patent is extended or adjusted under 35 U.S.C. 154(b) by 300 days.

(21) Appl. No.: 16/740,223

(22) Filed: Jan. 10, 2020

(65) Prior Publication Data

US 2020/0311092 A1 Oct. 1, 2020

(30) Foreign Application Priority Data

Mar. 28, 2019 (IN) .............................. 201941012256

(51) Int. Cl.
*G06F 16/2457* (2019.01)
*G06F 16/9535* (2019.01)
(Continued)

(52) U.S. Cl.
CPC ........ *G06F 16/24578* (2019.01); *G06F 16/27* (2019.01); *G06F 16/9535* (2019.01); *G09B 7/02* (2013.01)

(58) Field of Classification Search
CPC ............... G06F 16/24578; G06F 16/27; G06F 16/9535; G09B 7/02
See application file for complete search history.

(56) References Cited

U.S. PATENT DOCUMENTS 8,316,019 B1 11/2012 Ainslie et al.
8,583,632 B2 11/2013 Libes et al.
(Continued)

FOREIGN PATENT DOCUMENTS

WO WO-2012031052 A2 * 3/2012 ............. G06Q 10/10
WO WO-2017070667 A1 * 4/2017 ....... G06F 17/30377

OTHER PUBLICATIONS

Imran et al., PLORS: a personalized learnign object recommender system, Vietnam J Computer Science (2016), pp. 3-13.
(Continued)

*Primary Examiner* — Sherief Badawi
*Assistant Examiner* — Earl Levi Elias
(74) *Attorney, Agent, or Firm* — Maschoff Brennan (57) ABSTRACT

A system for identifying academic content relevant to a user, from academic content hosted by a knowledge base, based on character(s) entered, is disclosed. The system is configured for receiving the character(s) entered by the user to form a search query. The system further identifies intent of the search query for re-writing the search query to instantiate a set of filters. The system is configured for applying one or more multilevel protocols on the search query for retrieving a plurality of content blocks and further assigning a score to each of the content blocks retrieved for disambiguating the content blocks. The system is configured for retrieving a node of the knowledge base associated with the disambiguated content block and retrieving academic content hosted by the node and associated widgets instantiated with content relevant to the user.

11 Claims, 7 Drawing Sheets

(51) Int. Cl.
    *G06F 16/27*     (2019.01)
    *G09B 7/02*     (2006.01)

(56) References Cited

U.S. PATENT DOCUMENTS

| | | | |
|---|---|---|---|
| 9,342,623 B2* | 5/2016 | Narayanan | G06F 16/9024 |
| 2002/0123990 A1* | 9/2002 | Abe | G06F 16/7328 |
| 2005/0119988 A1* | 6/2005 | Buch | G06F 9/5027 |
| 2007/0260598 A1 | 11/2007 | Odom | |
| 2009/0259624 A1* | 10/2009 | DeMaris | G06F 16/24534 |
| 2013/0282486 A1* | 10/2013 | Rahle | G06F 3/04842 |
| | | | 715/751 |
| 2016/0078086 A1* | 3/2016 | Nowak-Przygodzki | |
| | | | G06F 16/24578 |
| | | | 707/723 |
| 2016/0306798 A1 | 10/2016 | Guo et al. | |
| 2018/0081880 A1* | 3/2018 | Kennedy | G06F 16/24578 |
| 2019/0012388 A1 | 1/2019 | Torras | |

OTHER PUBLICATIONS

"Explicit semantic ranking for academic search via knowledge graph embedding". In proceedings of the 26th international conference on world wide web, Xiong C, Power R, Callan J., Apr. 3, 2017.

* cited by examiner

SYSTEM AND METHOD FOR PERSONALIZED RETRIEVAL OF ACADEMIC CONTENT IN A HIERARCHICAL MANNER

PRIORITY STATEMENT

The present application hereby claims priority to Indian patent application number 201941012256 filed 28 Mar. 2019, the entire contents of which are hereby incorporated herein by reference.

FIELD

The present disclosure generally relates to online search engines and more particularly to a system and a method for personalized retrieval of academic content in a hierarchical manner in response to a user's query.

BACKGROUND

Online search is a common practice today, performed by several class of individuals including students for interactively searching for and retrieving requested information via a user device from various databases. Most, if not all, users are acclimated to using search engines to submit queries that fetches the information that they need.

Particularly, for users searching for academic content using a search engine, some of the foremost requirements include: access to search results that contain study material to learn and revise concepts, practice questions to reinforce what is known to have been learnt, taking test assessments to get a feel of the real world testing formats and time constraints, watching video lectures on academic concepts, and also reading up on the latest news from the world of competitive examinations.

Furthermore, for the search queries that contain academics related keywords, the traditional search engines do not retrieve and display relevant results at various hierarchy levels including but not limited to, for example an examination, subject, chapter, concept, and so on. Traditional search engines retrieve documents or results which are usually text based. In addition, the content discovery and surfacing techniques adopted by the existing search engines are not personalized to individual users.

SUMMARY

This summary is provided to introduce a selection of concepts in simple manners that are further described in the detailed description of the disclosure. This summary is not intended to identify key or essential inventive concepts of the subject matter nor is it intended to determine the scope of the disclosure.

Existing search engines do not address the issue of identifying the most relevant academic content and more specifically do not provide the personalized retrieval of academic content in a hierarchical manner in response to user's query.

To overcome at least some of the above mentioned problems, a system and a method for identifying and retrieving academic content in a hierarchical manner in response to explicit and implicit user requirements is needed. A system and method is needed that retrieves relevant content blocks, based on a search query entered by the user and ranks the retrieved content blocks taking into consideration various weighting factors. A system and method is needed that is configured to sort and order the retrieved content blocks, select and disambiguate the sorted content blocks at the appropriate academic level, unfold a node of a knowledge base, associated with the selected content block at multiple hierarchical levels, and display the academic content relevant to the user.

Briefly, according to an exemplary embodiment, a system for identifying academic content relevant to a user, from academic content hosted by a knowledge base, based on one or more characters entered by the user in a search window is provided. It should be noted here that the term character is used here, for the sake of brevity, to refer to alphabets, numerals and special characters and symbols that can be typed using a keyboard associated with a computer of any known type and on mobile devices and so on. Such alphanumeric and special characters and symbols are known to be used for searching for content related to mathematics and the natural sciences, for example. The system includes a processor in communication with a memory. The memory stores the knowledge base, and the processor is configured for receiving, in at least one of near real time and real time, the one or more characters entered by the user to form a search query. The processor is configured for applying one or more multilevel protocols on the one or more characters entered by the user, for retrieving a plurality of content blocks. The processor is configured for assigning a score to each of the content blocks retrieved, the score being based on one or more factors, for disambiguating the content blocks. The processor is configured for repeating the steps, of receiving the search query, applying of one or more multilevel protocols, and assigning the score, until the score of a content block satisfies each of one or more conditions for selecting the content block as a final content block. The processor is configured for retrieving a node of the knowledge base associated with the final content block and retrieving academic content hosted by the node as the content relevant to the user.

Briefly, according to an exemplary embodiment, a method for identifying academic content relevant to a user, from academic content hosted by a knowledge base, based on one or more characters entered by the user in a search window is provided. The method includes providing, by a processor, through a user interface, the academic content relevant to the user. The processor is coupled to a memory, wherein the memory stores a plurality of modules to be executed by the processor, and wherein the plurality of modules are configured for receiving, in at least one of near real time and real time, the one or more characters entered by the user to form a search query, applying one or more multilevel protocols on the one or more characters entered by the user, for retrieving a plurality of content blocks, assigning a score to each of the content blocks retrieved, the score being based on one or more factors, for disambiguating the content blocks, repeating the steps of receiving the search query, applying of one or more multilevel protocols, and assigning a score, until the score of a content block satisfies each one of one or more conditions for selecting the content block as a final content block, retrieving a node of the knowledge base associated with the final content block and retrieving academic content hosted by the node as the content relevant to the user.

The summary above is illustrative only and is not intended to be in any way limiting. Further aspects, exemplary embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein:

FIG. 3-A is a flow chart illustrating a method for identifying academic content for a search query, according to an embodiment of the present disclosure;

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

Embodiments of the present disclosure relates to customized and personalized content delivery for a search query, and more specifically, but not limited to, a system and method for academic content delivery. Embodiments of the present disclosure particularly disclose a system and method configured for identifying and retrieving relevant academic content, which is stored in a hierarchical manner in a data store (knowledge base), in response to explicit and implicit user information needs. A system and a method are disclosed that retrieves relevant content blocks by applying one or more multilevel protocols on the one or more characters being entered by the user. A system and a method are disclosed that ranks the retrieved content blocks, based on a score assigned, taking into consideration various weighting factors for disambiguating the content blocks. A system and a method are disclosed for retrieving a node of the knowledge base associated with a final content block which is the disambiguated content block for retrieving academic content hosted by the node as the content relevant to the user.

In one embodiment, the content described herein may be a learning content. The learning content may include academic content. The learning content may also include non-academic content, for example, for vocational training and the like. It is to be noted, that the content block described herein may be a retrieved search result or possible search result to be retrieved in response to a search query entered in a search window through a user interface of an associated application. It is to be noted, that identifying the academic content relevant to the user described herein refers to searching and displaying academic content on a user device, in response to the search query entered by the user. Further, it is to be noted that the term knowledge base described herein, is known in the field of the art to which this disclosure belongs and is a method for storing complex structured and unstructured information used by a computer system. The knowledge base comprises content arranged as a topology comprising a plurality of interlinked nodes, wherein each node represents a concept.

In some embodiments, the word 'user', 'learner', 'student' and 'individual' used in the description may refer to the person or entity and are synonyms, in this context and may be used interchangeably. Embodiments of the present invention will be described below in detail with reference to the accompanying figures.

Figure 1:
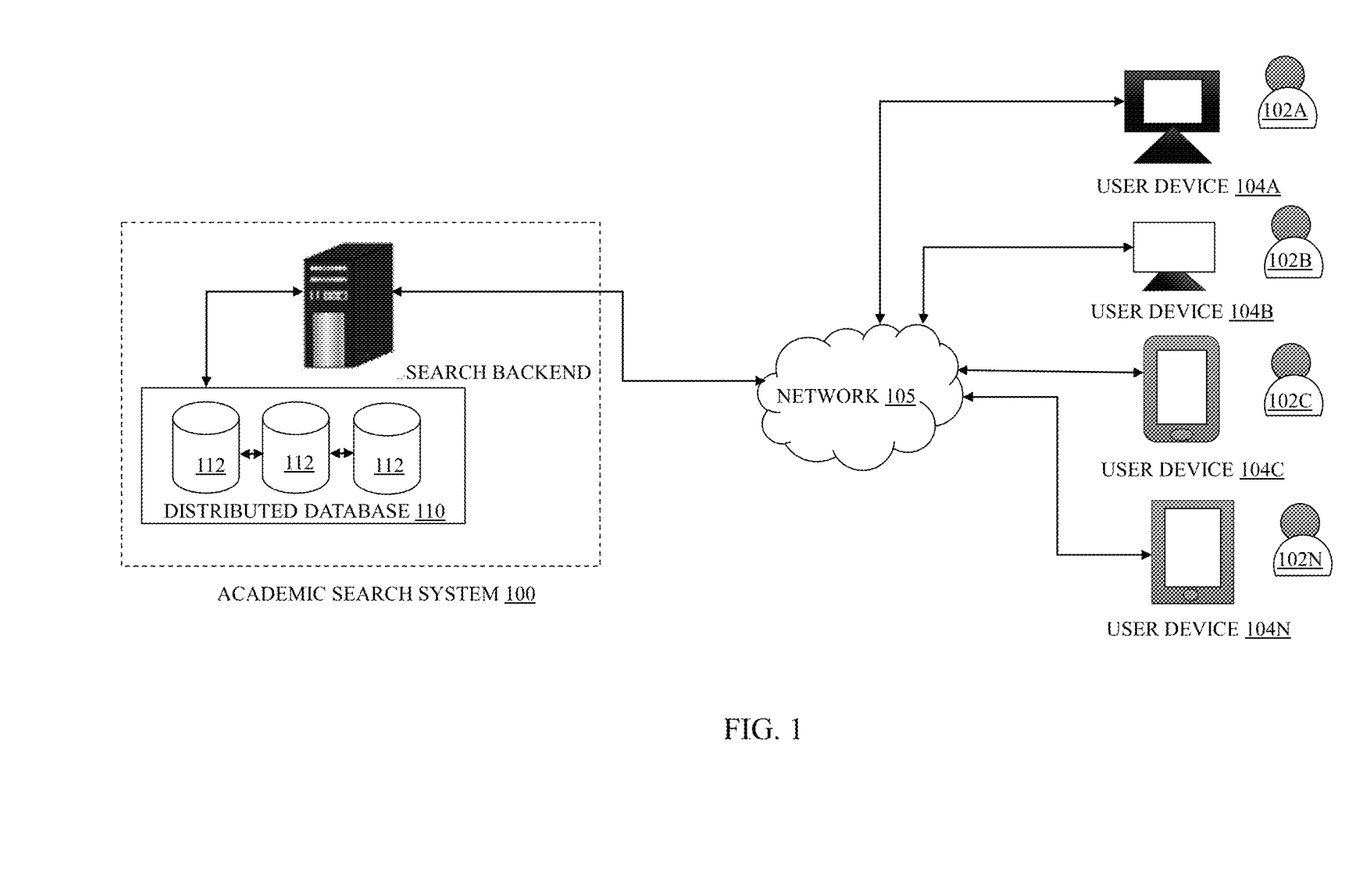
FIG. 1 illustrates an exemplary network architecture of an academic search system for identifying academic content relevant to a user, from academic content hosted by a knowledge base, based on one or more characters entered by the user in a search window, according to an embodiment of the present disclosure.

FIG. 1 illustrates an exemplary network architecture of an academic search system 100 for identifying academic content relevant to a user, from academic content hosted by a knowledge base 112, based on one or more characters entered by the user 102 in a search window, according to an embodiment of the present disclosure. In particular, the FIG. 1 illustrates users 102-A-N, user devices 104-A-N, a network 105, and the academic search system 100 communicatively coupled to a distributed database 110 such as the knowledge base 112.

The academic search system 100 is a search platform for content discovery, specifically focusing on academic content. The academic search system 100 is the search platform, for various needs of users 102-A-N, which includes identification of relevant and personalized academic content, based on the search query entered by the user 102. In one example, the identified academic content include studying material to brush up on concepts, practicing questions to reinforce what was learned, taking test assessments to get a feel of real world testing formats and time constraints, and also reading up on the latest news from the world of competitive examinations. The academic search system 100 is configured so as to rapidly and effectively bring to the surface the content relevant to users 102-A-N. The academic search system 100 as disclosed herein may also be referred to as search-based User Interface (UI) enabled by an application installed on the user device 104-A-N and is adaptable to the user 102.

Further, the users 102-A-N may communicate with the academic search system 100 using one or more user devices 104-A-N through the network 105. Examples of the user devices 104 include, but are not limited to, a mobile phone, a computer, a tablet, a laptop, a palmtop, a handheld device, a telecommunication device, a personal digital assistant (PDA), and the like. Examples of the network 105 include, but are not limited to, a mobile communication network, a Local Area Network (LAN), a Wireless Local Area Network (WLAN), a Wide Area Network (WAN), internet, a Small Area Network (SAN), and the like.

Referring to FIG. 1, the academic search system 100 is communicatively coupled to the database 110. The database 110 includes the knowledge base 112. The academic content is hosted on the knowledge base 112. In one embodiment, the knowledge base 112 hosts content (knowledge data) which is a collection of discrete concepts with connections and relationships between them. The content is arranged as a topology comprising a plurality of interlinked nodes, wherein, each node represents a concept. In one exemplary embodiment, content hosted on the knowledge base 112 is clustered into several logical units and sub-units (for example, examinations, subjects, units, chapters, concepts, etc.) and are indexed for implementing the search retrieval system. Each logical unit or sub-unit may be referred to as content blocks. This vertical specific indexing allows each content block to be treated differently as needed by the index-time and query-time text processing modules. The architecture of the knowledge base 112 is such that it expands its content to hundreds of examinations over dozens of syllabi. The academic search system 100 is configured to be used in academic settings for retrieving educational content. The academic search system 100 is mainly focused on exposing academic content, rather than burying it under heaps of menus and tabs, to the users 102-A-N via a search-based UI. A manner in which the academic search system 100 of FIG. 1 operates for identifying the academic content for the search query is described in detail further below.

Figure 2:
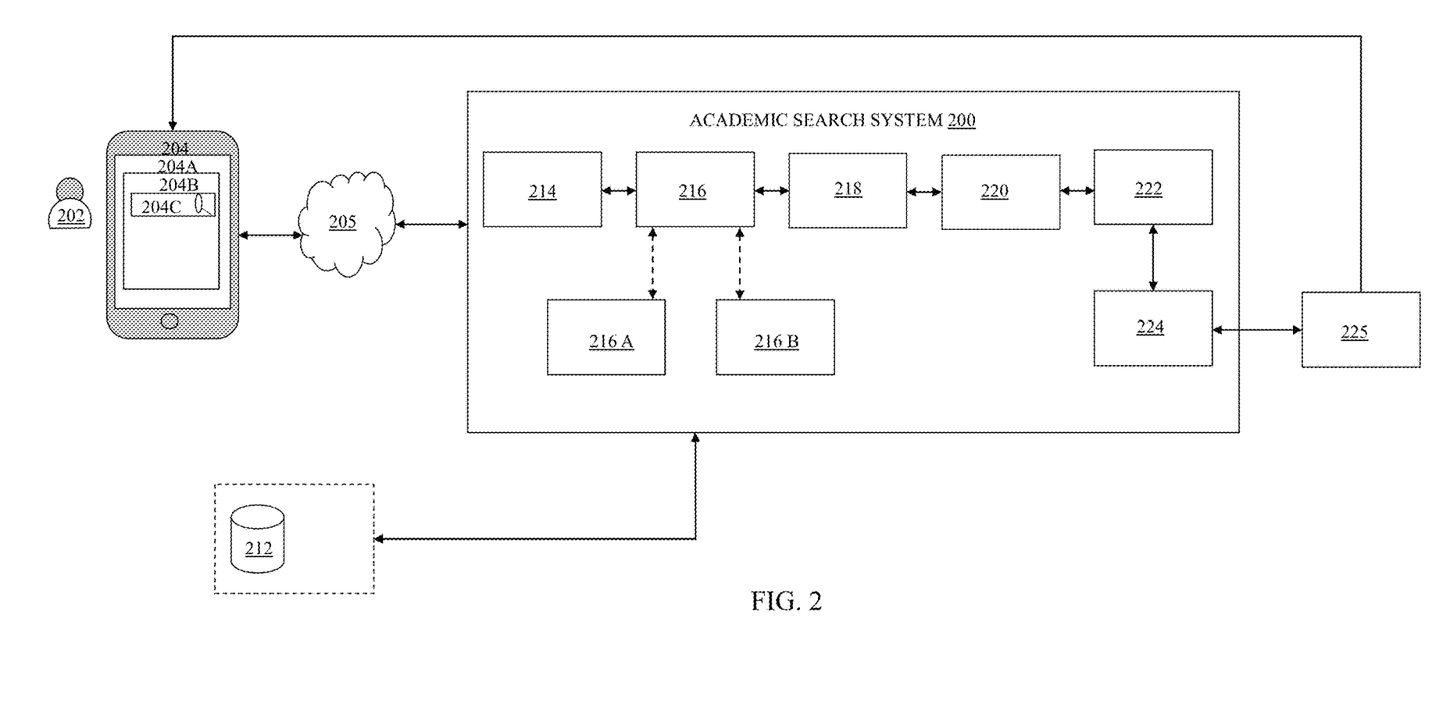
FIG. 2 illustrates an exploded view of the academic search system of FIG. 1, according to an embodiment of the present disclosure.

FIG. 2 illustrates an exploded view of the academic search system 100 of FIG. 1, according to an embodiment of the present disclosure. FIG. 2 illustrates an academic search system 200 for identifying academic content relevant to the user, from academic content hosted by a knowledge base 212, based on one or more characters entered by the user in a search window, according to an embodiment of the present disclosure. In particular, the FIG. 2 illustrates the user 202, a user device 204, a network 205, and the academic search system 200 communicatively coupled to a database 210 storing the knowledge base 212. The academic search system 200 includes a search query 214, a keyword identification module 216, a retrieval module 218, a disambiguation module 220, an unfolding module 222, and a widget association module 224. The identified academic content is referred to by reference numeral 225. Each block is explained in detail further below.

It is to be noted that FIG. 2 is explained with respect to a single user, for example the user 202, however, it should be noted that the present disclosure can be similarly applied to multiple users.

The academic search system 200 is configured for identifying the relevant academic content 225 in response to explicit and implicit information needs of the user 202. The academic content 225 is identified from the content, which is hosted on the knowledge base 212, stored in a database 210 in a hierarchical manner. The relevant academic content 225 referred to herein may be in the form of text, a video, an audio, a graphic, etc.

As described above, the user 202 may use the academic search system 200 for various needs which may include, getting access to study material to brush up on concepts, practicing questions to reinforce what was learned, taking test assessments to get a feel of real world testing formats and time constraints, and also reading up on the latest news from the world of competitive examinations. The user 202 can enter a search query on a search window 204C of an associated application 204B through the user interface 204A on the user device 204 to search for a relevant academic content 225. The search query 214 is received in one of near real time and real time that may include one or more characters entered by the user 202.

The academic search system 200 is configured for receiving, at least one of near real time and real time, one or more characters entered by the user 202 to form the search query 214.

When the search query 214 or part thereof is received, as a first step, the ability level of the user 202, is queried from a user data lookup store (ESR). The ESR stores the user-to-ability level mapping of every user, indexed by a unique user identifier, and is updated by data processing jobs at frequent intervals. Further, as a second step, i.e., "Search execution", firstly, query rewriting is performed. The search query is rewritten. To this search query, lexical pre-processing is applied. Lexical pre-processing methods known in the art are implemented. As known in the art, the lexical pre-processing requires only lexical analysis, that is, they operate on the source text, prior to any parsing, by performing simple substitution of tokenized character sequences for other tokenized character sequences, according to user defined rules. They typically perform macro substitution, textual inclusion of other files, and conditional compilation or inclusion. Post the application of lexical pre-processing on the search query, cleanup is applied, followed by a check for any explicitly defined substitutions that need to take place (from historical query failures).

The keyword identification module 216 is configured for identifying intent of the search query 214 for rewriting/structuring the query to instantiate a set of filters prior to applying the one or more multilevel protocols. In one example, identification of one or more keywords (216-A) possibly intended by the user 202, based at least on the one or more characters entered by the user 202 and one or more contextual elements 216-B associated with the user 202 is performed. In one example, the "Intent keywords", for the search query 214 may contain intent specific keywords or phrases, for example, full test, chapter test, practice, learn, etc. For the intent specific keywords, the system 200 restricts the indices being queried from, and only returns the appropriate set of results which can be directly acted upon. In another example, the contextual elements associated with the user 202 are also considered by the keyword identification module 216 for identifying one or more keywords possibly intended (216-A) by the user 202. In one embodiment, the contextual elements for the user 202 may be predetermined elements and also may be updated by the system 200 at frequent intervals. In one example, the contextual elements for the user 202 may be academic context of the user 202, a behavioral context of the user 202, one or more characteristics of the user 202, a learning strategy of the user 202, importance of concept and other contextual elements associated with the user 202. The other contextual elements associated with the user 202 may include, but not limited to, learning adaptability, learning needs, prior knowledge, the amount of time the user 202 is able to spend to learn a large amount of content, the age of the user 202, pedagogy, historical empirical evidence on learning outcomes of the user 202, conceptual interconnections in the knowledge base 212, and many more such factors that influence the context of the user 202 are considered for identification of one or more keywords for identifying relevant academic content 225 for the user 202.

The retrieval module 218 is configured for applying one or more multilevel protocols on the one or more characters entered by the user 202, for retrieving a plurality of content blocks. In one embodiment, the academic search system 200 is configured to manage various possible input queries 214. The multilevel protocols include a k-level fallback protocol. The system 200 is configured to apply the k-level fallback protocol when querying content indices. Various protocols are implemented and are as described below. It is to be noted that the academic content is hosted by the knowledge base 212 in a hierarchical manner and the retrieval mechanism of the retrieval module is configured to exploit this hierarchy.

In one embodiment the first protocol includes, a first fallback level, a second fallback level and a third fallback level. In the first fallback level of the first protocol, the retrieval module 218 is configured to look for up to n-edit distance lexical matches on edge nGrams of the content title field. In the second fallback level of the first protocol, the retrieval module 218 is configured to look for up to n-edit distance lexical matches on edge nGrams of content title and description fields. In the third fallback level of the first protocol, the retrieval module 218 is configured to look for up to n-edit distance lexical matches on nGrams of the content title and description fields.

In one embodiment, the second protocol also include, a first fallback level, a second fallback level and a third fallback level. In the first fallback level of the second protocol, the retrieval module 218 is configured to look for exact lexical matches on the entire content title field. In the second fallback level of the second protocol, the retrieval module 218 is configured to look for up to n-edit distance lexical matches on the entire title field. In the third fallback level of the second protocol, the retrieval module 218 is configured to look for up to n-edit distance lexical matches on nGrams of the entire title field.

In one embodiment, the third protocol also include, a first fallback level, a second fallback level and a third fallback level. In the first fallback level of the third protocol, the retrieval module 218 looks for exact lexical matches on the entire content title and description fields. In the second fallback level of the third protocol, the retrieval module 218 looks for up to n-edit distance lexical matches on the entire title and description fields. In the third fallback level of the third protocol, the retrieval module 218 looks for up to n-edit distance lexical matches on nGrams of the title and description fields.

It is to be noted that the one or more multilevel protocols are applied concurrently for facilitating multi pass retrieval of the plurality of content blocks. Further, the content title and the description fields used herein refers to the titles and description fields of the documents hosted by the knowledge base 212.

In one embodiment, the academic search system 200 is configured for assigning a score to each of the content blocks retrieved, based on a plurality of factors, for disambiguating the content blocks. The plurality of factors include, but not limited to, the academic context of the user 202, the cohort context of the user 202, relevance of keywords in the query 214 to the contextual elements associated with the user 202, negative weights for the irrelevant keywords, time duration related context, calendar related context. The subsequent paragraphs disclosed herein describe in detail the plurality of factors considered for assigning the score to each of the content block retrieved, for disambiguating the content blocks.

In one example embodiment, the score is computed based on a combination of various weights which are determined based on the plurality of factors as described above. In other words, the plurality of factors are considered to determine a weight to be allocated to a particular content block hosted by the knowledge base 212.

In one embodiment, one of the factors for determining the weight to be allocated to a specific content block may be the academic context of the user 202. In one example, the user's academic context is determined based on examination specific content weight. The examination specific content weight may include a score factor weight that indicates how important a document, or a content block is with respect to a specific examination. In another example, the user's academic context is determined based on at least one of a learning context and a consumption context of the user 202. In one example, the learning context may be driven by data such as user's level of study. It is to be noted that the level of study may be the number of academic years of study a student has completed. In various systems of education, it may be referred to as standard. For example, seventh standard. This means the learner has studied for six academic years and is in the seventh year of study. The other terms used are grade, class, year, form, standard, etc. Further the academic year may be divided into semesters or trimesters and so on. The academic context then would be, seventh standard-second semester, for example. Based on the explanation above, what is meant will be evident to the person skilled in the art. In one example, the learning context may be driven by data such as user's goal and examination to be attended by the user 202. It may also be a combination of one or more of level, goal, and examination of the user 202. A user's goal may be obtaining a certain percentage of marks or a CPA or some such academic measure, for instance. The weight allocated to the content block based on the academic context of the user 202 is the extrinsic weight.

In one embodiment, one of the factors for determining the weight to be allocated to a content block may be the user's cohort context. In one example, the cohort context for the user 202 is determined based on other lookalike users who share a significant experience at a certain period of time or have one or more similar characteristics with respect to the user 202. In one example, the user's cohort context may be determined based on, but not limited to, user cohort specific content conversion factor, user cohort specific content affinity and the like. The user cohort specific content conversion factor may include score factor weight to boost the final score based on how likely it is for the user 202 belonging to any given user cohort (user cluster or group) to increase their academic ability on consuming the content block. The user cohort specific content affinity factor may include score factor weight that indicates how likely it is for a user belonging to any given user cohort (user cluster or group) to consume (click through) that content.

In one embodiment, one of the factors for determining the weight to be allocated to a specific content block may be the relevance of keywords typed by the user 202 in the search query 214, to the contextual elements associated with the user 202. In one example, the relevance of keywords in the search query 214 to the contextual elements associated with the user 202 is determined based on the lexical match score and document title overlap weightage. The lexical match score may include similarity score between search query 214 and content block title matches in the database 110. The document title overlap weightage may include a score factor weight to give a boost to the final score, if parts or all the document/content block title from the databases match the search query 214.

In one embodiment, one of the factors for determining the weight to be allocated to a content block may be negative weights for the irrelevant keywords. For example, negative weights are allocated to the content related to NSFW which means Not Suitable for Work, but mostly accepted as Not Safe for Work. In one example, score factor weight may be considered to penalize the final score, if parts or all of the document/content block title from the databases match any entries in a curated dictionary of inappropriate words.

In one embodiment, one of the factors for determining the weight to be allocated to a specific content block may be time duration related context. The time duration related context may include time decayed content trends. The time decayed content trends may include a score factor weight that indicates the daily, weekly, monthly, yearly probability of consumption of a particular document/content block. In one example, the user 202 may be accessing or consuming a 'A' content block on daily basis, a 'B' content block on weekly basis or a 'C' content block on monthly basis and/or might be following a pattern for content consumption. Based on the amount and interval of time, the user 202 spends on consumption of a particular content block, the time decayed content trends are analyzed. The time decayed content trends enable the system 200 to calculate the future probability of the content consumption for the user 202. This information is used as one of the factors for determining the weight to be allocated to a specific content block.

In one embodiment, one of the factors for determining weight to be allocated to a specific content block may be calendar related context. The calendar related context may include month-based content weights which includes score factor weight that indicates the month specific probability of consumption of a particular document/content block.

As mentioned above, the score is assigned to each of the content block retrieved, based on the plurality of factors which are utilized for computation of various weights to each of the content blocks hosted by the knowledge base 212.

The disambiguation module 220 of the academic search system 100 is configured for assigning the score to each of the content blocks retrieved, based on the plurality of factors, for disambiguating the content blocks and further selecting a content block as a final content block. The final content block is selected when all the conditions as mentioned are satisfied. One of the first condition, for selecting the content block as the final content block includes, the score of the final content block being greater than the scores of all other retrieved content blocks. The second condition, for selecting the content block as the final content block includes, the score of the final content block should be greater than a predetermined threshold. The third condition, for selecting the content block as the final content block includes, the score of the final content block satisfies a predefined relationship with the scores of all the other content blocks. In one example embodiment, for the third condition, to be satisfied, the score of the final content block should be greater than a predefined multiple of the score of the second content block and remaining content blocks. The second content block referred herein, is the content block having second highest score, that is, less than the score of the final content block.

For example, considering the score range of 10 to 100, and for the content block to be selected as the final content block, the score of the final content block should be greater than the scores of the all other content blocks, for example (may be 95), the score of the final content block should be greater than a predetermined threshold, for example (may be above 45), and the difference in scores between, the score of the final content block and the second content block should meet a predefined multiple, (for example, the score of the second content block should be less than 80). For example, when the score of the second content block is 92, the steps of the reception of the search query 214, the retrieval module 218, the disambiguation module 220, are repeated.

In one example embodiment, the plurality of content blocks retrieved are sorted in decreasing order of the scores assigned and documents that fall below a threshold are discarded. If the top result (i.e., the content block with highest score) in the ranked result set has the final score that exceeds the next result (score of the next content block having second highest score) by a predetermined value, it is indicative of the system 200 having brought to the surface a highly relevant result to the search query 214. The steps of the reception of the search query 214, the retrieval module 218, the disambiguation module 220, are repeated until the score of the content block satisfies each of one or more conditions for selecting the content block as the final content block.

Further, the unfolding module 222 is configured for retrieving a node of the knowledge base 212 associated with the final content block after the step of selection of the final content block which is the relevant academic content 225. The academic search system 200 uses the knowledge base 212 to bring to the surface as much relevant academic content 225 to be displayed to the user 202, for the search query 214 received, as available. Further, the academic search system 200 is configured to present the user 202 with various actionable items related to such relevant academic content 225. As described above, each piece of content block is tagged to some node on the knowledge base 212, and all the learning maps associated with it. Therefore, the unfolding module 222 unfolds the lower levels of the top result (that is, final content block with highest score), when the content block that has been deemed disambiguated by the disambiguation module 220. Unfolding the node for the disambiguated content block (final content block) retrieves all lower level content nodes as well as widgets and actionable items which are sorted based on historical click rates.

The widget association module 224 is configured for retrieving the academic content hosted by the node of the knowledge base 212. The widget association module 224 is configured for fetching a plurality of academic widgets associated with the node and its sub-nodes in a hierarchical manner. Furthermore, the widget association module 224 is configured for populating each of the plurality of academic widgets with one or more associated actionable content from the knowledge base 212.

In one example, for the academic use case however, there are a number of other types of content including videos, practice question sets, assessment tests, study reference links, interactive 3D models, academic games, and the like, associated with the node of the knowledge base 112. Based on the type of interactions possible on these content types, the widget association module 224 is configured for retrieving the academic content hosted by the node as the relevant content to the user 202 in form of the "actionable widgets". The widget association module 224 is configured for executing a step of "Widget Association", for each final content block that has been unfolded by the unfolding module 222.

The widget association module 224 is configured for ranking each of the plurality of academic widgets for displaying the academic content to the user 202 in descending order of rank. In one example, the widget association module 224 is configured for executing the step of "Widget Ranking", wherein the widgets which are associated to the content blocks are re-ranked for relevance. In one exemplary method of reranking widgets is to assign each widget a numerical score. Such a score is computed by combining various weighting factors as referred to above including historical likelihood of user 202 interaction, importance of the widget based on examination, time remaining for the examination, user's preference for that widget type may be among any such factors. The widgets are then sorted in decreasing order of score and then displayed to the user 202.

Furthermore, the widget association module 224 is also configured for the ranking each of the one or more actionable content within each of the plurality of academic widgets based on the one or more contextual elements of the user 202 for displaying the actionable content to the user 202 in descending order of rank. In one example, each widget is in itself treated as a placeholder which can contain nested results which can further be ranked. This step is known as "Widget Instantiation" where each widget placeholder is filled with relevant content items which are themselves ranked according to relevance to users. For instance, a widget can contain questions that have appeared in previous questions papers for an examination. The questions can be ranked according to relative importance for the specified examination based on several weighting factors.

Embodiments of the academic search system 200 disclosed herein also provides a mechanism wherein students are shown recommendations for targeted content to dedicate their time, based on their past interaction with the platform, if sufficient data is available, or based on lookalike users in cases where there is insufficient data for a given user 202. The academic search system 200 disclosed herein is for recommending the plurality of academic widgets to the user 202, based on the user's implicit information obtained from a plurality of predetermined factors including one or more of, but not limited to, user's search history and user's predetermined context.

Embodiments of the academic search system 200 disclosed herein also provides for customized suggestions that are generated by ranking academic content that target user's specific knowledge weaknesses at the highest search result position after unfolding node, using user 202 attempt data on content by user 202. Embodiments of the academic search system 200 disclosed herein also provides customized recommendations such as recommendations for academic content where the user 202 is at a very low percentile standing compared to the rest of his/her academic cohort, and also recommendations for question packs containing specialized cuts of behavior-targeted practice (mistakes of top rankers, careless mistakes of most students, etc.) which is useful in addressing specific user 202 behaviors.

In some embodiments, the above described system 200 may be implemented for applying one or more multilevel protocols on the received search query 214 and retrieving a final content block which is the relevant academic content 225. In some other embodiments, a manner in which the relevant academic content 225 is retrieved for identifying academic content relevant to a user, is described in further detail below.

Figure 3:
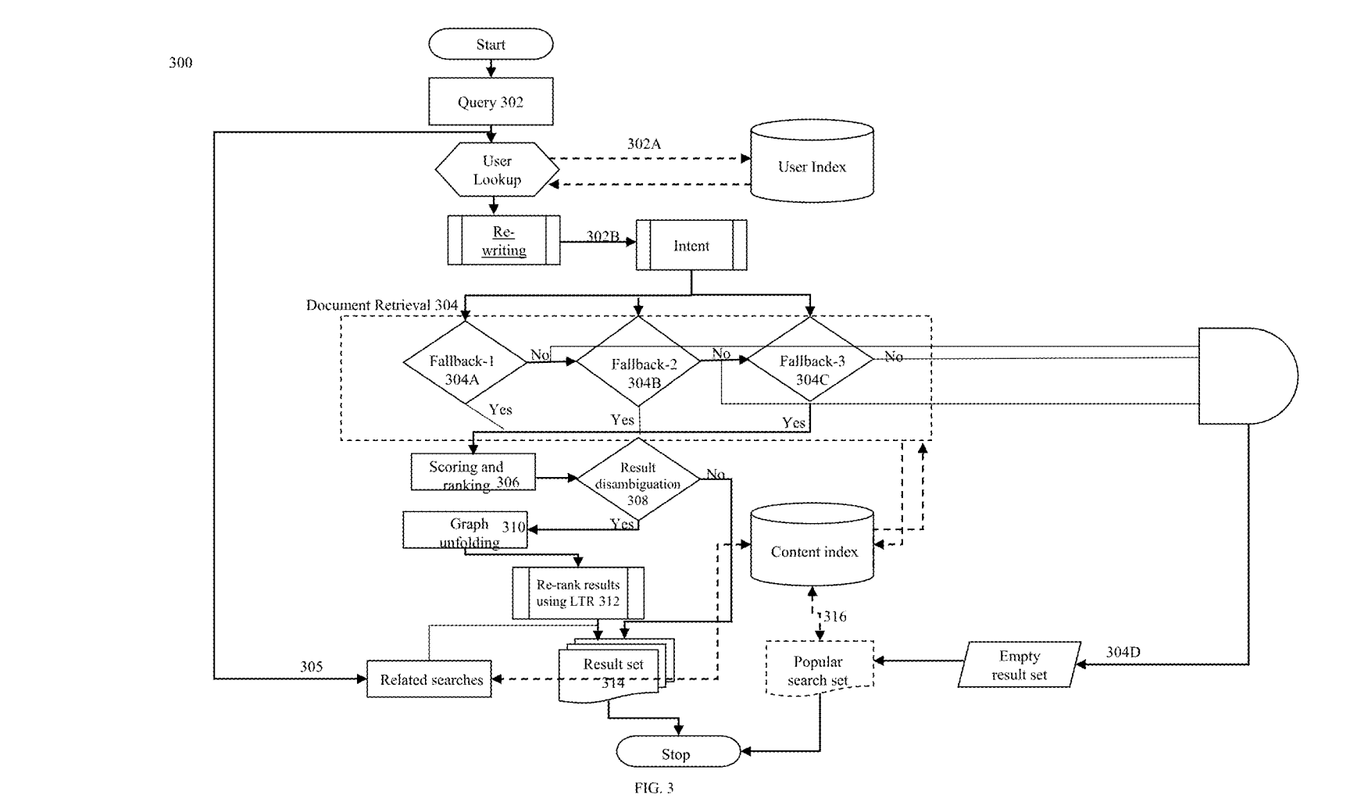
FIG. 3 is a flow chart illustrating a method for applying one or more multilevel protocols on a received search query and retrieving a relevant content block implemented according to an embodiment of the present disclosure.

FIG. 3 is a flow chart illustrating a method 300 for applying one or more multilevel protocols on a received search query and retrieving a content block implemented according to an embodiment of the present disclosure. FIG. 3 may be described from the perspective of a processor (not shown) that is configured for executing computer readable instructions stored in a memory to carry out the functions of the modules (described in FIG. 2) of the system 200. In particular, the steps as described in FIG. 3 may be executed for identifying academic content relevant to a user, from academic content hosted by a knowledge base on a distributed database, based on one or more characters entered by the user in a search window. Each step is described in detail below.

At step 302, one or more characters entered by the user are received in form of a search query in at least one of near real time and real time. Furthermore, when the search query or part thereof is received, as a first step as shown by reference numeral 302A, the ability level of the user, is queried from a user data lookup store (ESR). The ESR stores the user-to-ability level mapping of every user, indexed by a unique user identifier, and is updated by data processing jobs at frequent intervals. Further, as a second step, i.e. "Search execution", shown by reference numeral 302B, query rewriting is performed. At this step, the search query is rewritten. To this search query, lexical pre-processing is applied. Post the application of lexical pre-processing on the search query, cleanup is applied, followed by a check for any explicitly defined substitutions that need to take place (from historical query failures). In one embodiment, upon receiving the search query, a step for identifying intent of the search query for re-writing or structuring the query to instantiate a set of filters is performed.

At step 304, one or more multilevel protocols are applied on the one or more characters entered by the user, for document retrieval. In one example, a plurality of fallback mechanisms (multilevel protocols), for retrieving a plurality of content blocks, based on the identified intended keywords is applied. In one example, the retrieval module is configured for applying one or more multilevel protocols on the one or more characters entered by the user, for retrieving a plurality of content blocks. The multilevel protocols include a k-level fallback protocol. The retrieval module of system 200 as described above, is configured to apply the k-level fallback protocol when querying content indices, based on the search query. Various protocols are implemented and are as described in FIG. 2 above. It is to be noted that the academic content is hosted by the knowledge base in a hierarchical manner and the retrieval mechanism of the retrieval module is configured to exploits this hierarchy. In one embodiment the first protocol includes, a first fallback level, a second fallback level and a third fallback level shown by reference numeral 304A, 304B and 304C. It is to be noted that the one or more multilevel protocols is applied concurrently for facilitating multi-pass retrieval of the plurality of content blocks. If no documents or content blocks are retrieved, then empty result set (304D) is displayed to the user.

At step 306, a score is assigned to each of the content blocks retrieved, the score being based on one or more factors, for disambiguating the content blocks. The plurality of factors include, but not limited to the academic context of the user, the cohort context of the user, relevance of keywords in the query to the contextual elements associated with the user, negative weights for the irrelevant keywords, time duration related context, calendar related context. In one example embodiment, the score is computed based on a combination of various weights which are determined based on the plurality of factors as described above.

At step 308, the content blocks are disambiguated based on the score assigned for selecting the content block as a final content block. The final content block is selected when all the conditions as mentioned are satisfied. One of the first condition, for selecting the content block as the final content block include, the score of the final content block being greater than the scores of all other retrieved content blocks. The second condition, for selecting the content block as the final content block include, the score of the final content block should be greater than a predetermined threshold. The third condition, for selecting the content block as the final content block include, the score of the final content block satisfies a predefined relationship with the scores of all the other content blocks. The steps 302, 304, 306 and 308 are repeated, until the score of a content block satisfies each of one or more conditions for selecting the content block as a final content block. In other situation, when no content block is disambiguated, the content blocks retrieved are displayed to the user in decreasing order of score assigned.

At step 310, a node associated with the disambiguated content block of the knowledge base is unfolded (graph unfolding) for determining the academic content. In other words, the node of the knowledge base associated with the final content block is retrieved, by the unfolding module. The academic search system uses the knowledge base to bring to the surface as much relevant academic content to be displayed to the user, for the search query received, as available. Further, the academic search system is configured to present the user with various actionable items related to such relevant academic content. As described above, each piece of content block is tagged to some node on the knowledge base, and all the learning maps associated with it. Therefore, the unfolding module unfolds the lower levels of the top result (that is, final content block with highest score), when the content block that has been deemed disambiguated by the disambiguation module. Unfolding the node for the disambiguated content block (final content block) retrieves all lower level content nodes as well as widgets and actionable items which are sorted based on historical click rates.

At step 312, the academic content hosted by the node is retrieved as the content relevant to the user. The widget association module is configured for retrieving the academic content hosted by the node of the knowledge base. The widget association module is configured for fetching a plurality of academic widgets associated with the node and its sub-nodes in a hierarchical manner. Furthermore, the widget association module is configured for populating each of the plurality of academic widgets with one or more associated actionable content from the knowledge base. The widget association module is configured for retrieving the academic content hosted by the node of the knowledge base. The widget association module is configured for fetching a plurality of academic widgets associated with the node and its sub-nodes in a hierarchical manner. Furthermore, the widget association module is configured for populating each of the plurality of academic widgets with one or more associated actionable content from the knowledge base.

In one example, for the academic use-case however, there are several other types of content including videos, practice question sets, assessment tests, study reference links, interactive 3D models, academic games, and the like associated with the node of the knowledge base. Based on the type of interactions possible on these content types, the widget association module is configured for retrieving the academic content hosted by the node as the relevant content to the user in form of the "actionable widgets". The widget association module is configured for executing a step of "Widget Association", for each final content block that has been unfolded by the unfolding module. The widget association module is configured for ranking each of the plurality of academic widgets for displaying the academic content to the user in descending order of rank. In one example, the widget association module is configured for executing the step of "Widget Ranking", wherein the widgets which are associated to the content blocks are re-ranked for relevance. In one exemplary method of re-ranking widgets is to assign each widget a numerical score. Such a score is computed by combining various weighting factors as referred to above including historical likelihood of user interaction, importance of the widget based on examination, time remaining for the examination, user's preference for that widget type may be among any such factors. The widgets are then sorted in decreasing order of score and then displayed to the user (step 314).

The step 305 as shown in FIG. 3, provides suggestions for related searches retrieval. The step 305 is executed in parallel, along with the steps 302-312 after the reception of the search query (step 302). The related search retrieval is based on the past or historical queries of the user and other lookalike users. Furthermore, at step 316, when no content blocks are retrieved and the result set is empty (step 304D), then the popular search set based on the historical queries or queries entered by the lookalike users is displayed.

Figure 3A:
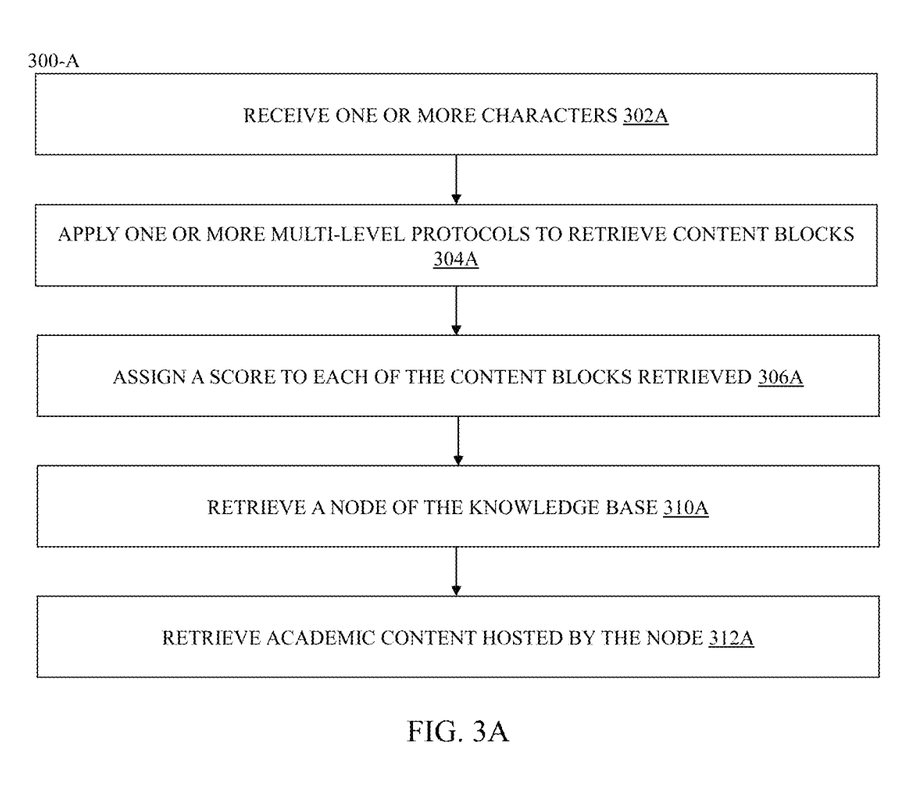

FIG. 3-A is a flow chart illustrating a method 300-A for identifying academic content for a search query, according to an embodiment of the present disclosure. FIG. 3-A illustrates a simplified version of FIG. 3. FIG. 3-A may be described from the perspective of a processor (not shown) that is configured for executing computer readable instructions stored in a memory to carry out the functions of the modules (described in FIG. 2) of the system 200. In particular, the steps as described in FIG. 3-A may be executed for identifying academic content relevant to a user, from academic content hosted by a knowledge base, based on one or more characters entered by the user in a search window. Each step is described in detail below.

At step 302A, one or more characters entered by the user are received in form of a search query in at least one of near real time and real time. Further at this step, intent of the search query is also identified for re-writing or structuring the query to instantiate a set of filters prior to applying the one or more multilevel protocols.

At step 304A, one or more multilevel protocols are applied on the one or more characters entered by the user, for retrieving a plurality of content blocks. The one or more multilevel protocols is applied concurrently for facilitating multi-pass retrieval of the plurality of content blocks.

At step 306A, a score is assigned to each of the content blocks retrieved, the score being based on one or more factors, for disambiguating the content blocks. The one or more factors for disambiguating the content blocks comprises, but not limited to academic context of the user, cohort context of the user, relevance of a keyword in the search query to one or more contextual elements associated with the user, negative weights for irrelevant keywords in the search query, time duration related context, calendar related context or combinations thereof.

The steps 302A, 304A, and 306A are repeated, until the score of a content block satisfies each of one or more conditions for selecting the content block as a final content block. The final content block is selected when all the conditions as mentioned are satisfied. One of the first condition, for selecting the content block as the final content block include, the score of the final content block being greater than the scores of all other retrieved content blocks. The second condition, for selecting the content block as the final content block include, the score of the final content block should be greater than a predetermined threshold. The third condition, for selecting the content block as the final content block include, the score of the final content block satisfies a predefined relationship with the scores of all the other content blocks.

At step 310A, a node of the knowledge base associated with the final content block is retrieved. At step 312A, the academic content hosted by the node is retrieved as the content relevant to the user. The retrieving of the academic content hosted by the node of the knowledge base comprises fetching a plurality of academic widgets associated with the node and its sub-nodes in a hierarchical manner. Each of the plurality of academic widgets are fetched with one or more associated actionable content from the knowledge base. Each of the plurality of academic widgets are ranked for displaying the academic content to the user in descending order of rank. Further, each of the one or more associated actionable content within each of the plurality of academic widgets are ranked based on the one or more contextual elements of the user for displaying the actionable content to the user in descending order of rank.

Figure 4:
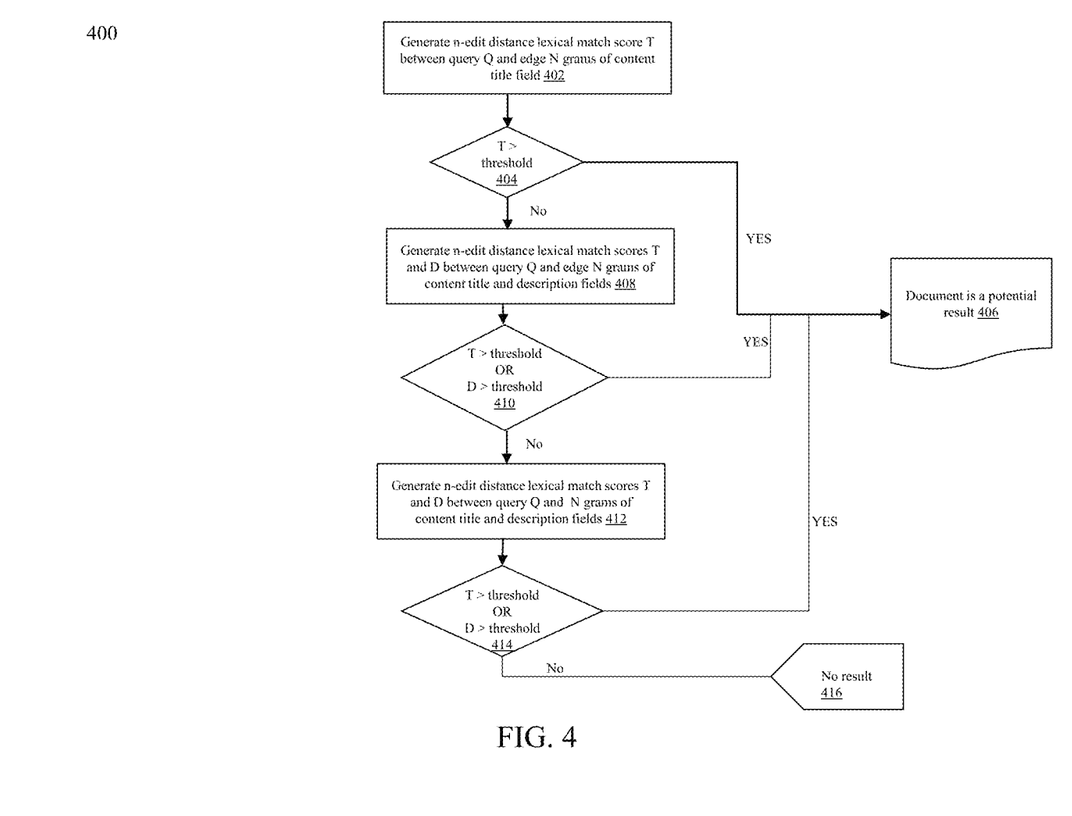
FIG. 4 is a flow chart illustrating an exemplary method of a multilevel protocol for identifying academic content for the search query, according to an embodiment of the present disclosure.

FIG. 4 is a flow chart 400 illustrating an exemplary method of a multilevel protocol for identifying academic content for the search query, according to an embodiment of the present disclosure. FIG. 4 may be described from the perspective of a processor (not shown) that is configured for executing computer readable instructions stored in a memory to carry out the functions of the retrieval module 218 described in FIG. 2 of the system 200. In particular, the steps as described in FIG. 4 may be executed for applying one or more multilevel protocols on the one or more characters entered by the user, for retrieving a plurality of content blocks. In one embodiment, the academic search system 200 is configured to manage various possible input queries. The multilevel protocols include a k-level fallback protocol. The system 200 is configured to apply the k-level fallback protocol when querying content indices. Various protocols are implemented, and one such exemplary protocol is described in detail below. Each step is described in detail below. It is to be noted that, edit distance computation methods known in the art are implemented.

At step 402, n-edit distance lexical match score 'T' between query 'Q' and edge 'N' grams of the titles of documents hosted by the knowledge base, is generated. Here, the query is the search query received by the system 200. At step 404, when the value of the score 'T' is greater than a predetermined threshold, a relevant document which is a potential result is retrieved (step 406). When the value of the score 'T' is less than the predetermined threshold step 408 is executed.

At step 408, n-edit distance lexical match scores 'T' and 'D' between query 'Q' and edge N grams of the titles and description fields of documents hosted by the knowledge base, is generated. At step 410, when the value of the score 'T' is greater than the predetermined threshold OR the value of 'D' is greater than the threshold, the relevant document which is a potential result is retrieved (step 406). Else, the step 412 is executed.

At step 412, n-edit distance lexical match scores 'T' and 'D' between query 'Q' and N grams of the titles and description fields of documents hosted by the knowledge base, is generated. At step 414, when the value of the score 'T' is greater than the predetermined threshold OR the value of 'D' is greater than the threshold, the relevant document which is a potential result is retrieved (step 406). Else, no result (step 416) is retrieved.

The above described system 200 and method 300 implemented for identifying academic content relevant to a user, from academic content hosted by a knowledge base, based on one or more characters entered by the user in a search window may employ a user interface to display identified academic content to the user. Some example interface implemented for displaying the identified academic content by the academic search system is described in further detail below. It is noted that the present technique is by no means intended to be limited to the example embodiment described below.

Figure 5:
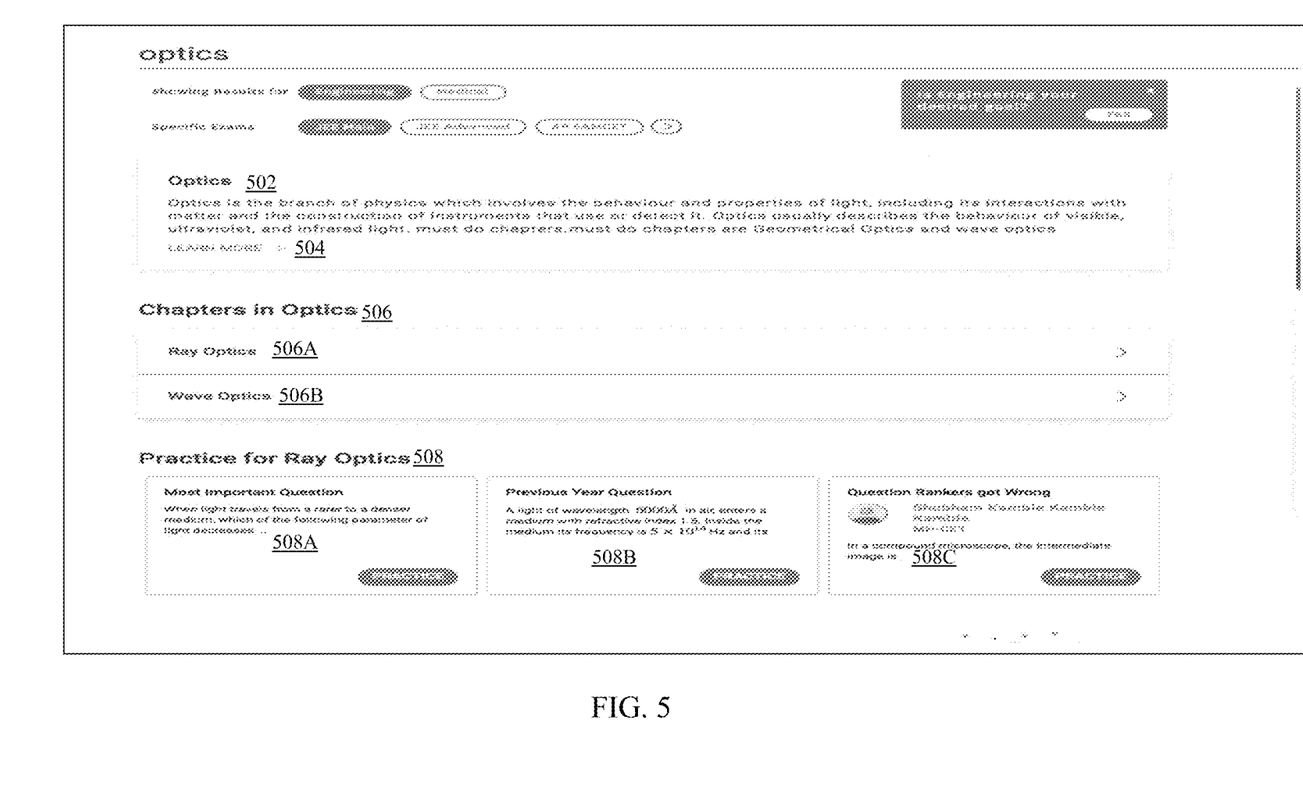
FIG. 5 is an exemplary screen illustrating a layout for displaying the identified academic content by the academic search system of FIG. 1, based on one or more characters entered by the user, according to an embodiment of the present disclosure.

FIG. 5 is an exemplary screen illustrating a layout 500 for displaying the identified academic content by the academic search system 200, based on one or more characters entered by the user, according to an embodiment of the present disclosure. In some embodiments, the steps executed by the academic search system 200 disclosed herein may be explained by considering an example scenario and is described in detail below.

In one example, the user 202 may be interested in the topical unit 'optics' and the chapter 'ray optics' or the concept 'optical properties of glass' and may be further interested in 'practice questions for ray optics.'

To initiate the search, the user 202 enters the characters 'OPT' in the search window. As described above, the user 202 can enter a search query on the search window 204C of the associated application 204B through the user interface 204A on the user device 204 to search a relevant academic content 225. The search query 214 is received in at least one of near real time and real time that may include one or more characters entered by the user 202 to form the query 214.

In the same example, the search query includes the characters such as 'O' 'P' 'T' entered by the user 202. If the user 202 enters intent specific keywords such as, for example 'full test question paper' and 'O' 'P' 'T', then the academic search system 200 restricts the indices being queried from, and only return the appropriate set of actionables.

The retrieval module 218 of the academic search system 200 is configured for applying one or more multilevel protocols on the letters 'O' 'P' ' T.' entered by the user 202 for retrieving a plurality of content blocks from the knowledge base 212. It is to be noted that, the applying of the one or more multilevel protocols is carried out concurrently for multi-pass retrieval of the plurality of content blocks from the knowledge base 212. Referring to the same example, all the content blocks starting with characters 'O' 'P' ' T' are retrieved from the knowledge base 212, by the retrieval module 218 of the academic search system 200. For example, the retrieval module 218 of the academic search system 200 retrieves, all the content blocks related to topics optics, optoelectronics, optometry, optical fibre, and the like.

Post the retrieval of the plurality of content blocks, the disambiguation module 220 of the academic search system 200 is configured to select single block based on a score assigned and one or more contextual elements of the user 202. That is, the disambiguation module 220 is configured for assigning the score to each of the retrieved content blocks, wherein the score is assigned based on a plurality of factors. The plurality of factors are based on predetermined weights allocated to each content block of the knowledge base 212. Then the unfolding module 222 unfolds a node of the knowledge base 212 associated with the single disambiguated content block having highest assigned score, for identifying the academic content relevant to the user.

Continuing with the above example, for the user 202, studying in $10^{th}$ grade, and having a syllabus related to optics, the disambiguation module 220 is configured to select the content block related to optics, which is derived based on the score assigned and the one or more contextual elements of the user 202. That is, the disambiguation module 220 selects the content block related to optics and discards all the content blocks such as optoelectronics, optometry, optical fibre, and the like. The unfolding module 222 is configured for unfolding the node related to optics to retrieve content blocks associated with the sub-topics. In this example, the unfolding module 222 unfolds the node for the content block optics and to retrieve content blocks associated with the sub-topics, for example 'ray optics' and 'wave optics'.

Referring to FIG. 5, the layout 500 of the exemplary screen shown, illustrates the search results for the search query 'OPT' entered by the user 202. The layout 500 illustrates the displayed content on the user interface 204A of the user device 204. It can be seen, that the academic search system 200 has identified the content 'Optic" and displayed the information in a sub-window, related to the academic content 'Optics' as shown by reference numeral 502. The user 202 also has an option to view the detailed version, by clicking on "learn more' hyperlink 504 as provided.

Further, the unfolding module 222 is configured for unfolding the node related to optics to retrieve content blocks associated with the sub-topics. In this example, the unfolding module 222 unfolds the node for the content block optics and to retrieve the content blocks associated with the sub-topics, for example 'ray optics' and 'wave optics'. The sub-window 506 as shown displays the chapters in optics, and content blocks such 'Ray Optics' 506A and 'Wave Optics' 506B.

Furthermore, the widget association module 224 is configured for fetching a plurality of academic widgets associated with the node and its sub-nodes in a hierarchical manner. It is to be noted, that there could be multiple levels of hierarchy for the sub-nodes. In one embodiment, for the academic use, there are a number of other types of content including videos, practice question sets, assessment tests, and study reference links. Such contents are described herein as "actionable widgets". In this step, known as "Widget Association", executed by widget association module 224, for each content block that has been unfolded and added to the results set, various "actionable widgets" associated with each content block become the documents that are displayed and are shown by reference numeral 508. In this example, the sub-window 508 displays 'practice for ray optics'. Each widget displayed is shown by reference numeral 508A-C. In this example, the widget association module 224 is configured for fetching a plurality of academic widgets shown by reference numeral 508A-C associated with the node and its sub-nodes in a hierarchical manner. For example, the most important question 508A, the previous year questions 508B and the question rankers got wrong 508C are the actionable widgets displayed by the academic search system 200. Thus, the academic search system 200 facilitates personalized retrieval of academic content in a hierarchical manner.

Embodiments of the academic search system 200 disclosed herein identifies academic content based on user queries, re-ranks relevant results based on the plurality of factors such as user ability, historical search trends and content consumption patterns, content difficulty to exam based on and past user interaction, among many other such weighting factors.

Embodiments of the academic search system 200 attempts to provide a framework which includes user data lookup, query rewriting, intent detection, multi-pass retrieval, query disambiguation, graph unfolding, and result re-ranking in order to implement a customized academic search engine.

Figure 6:
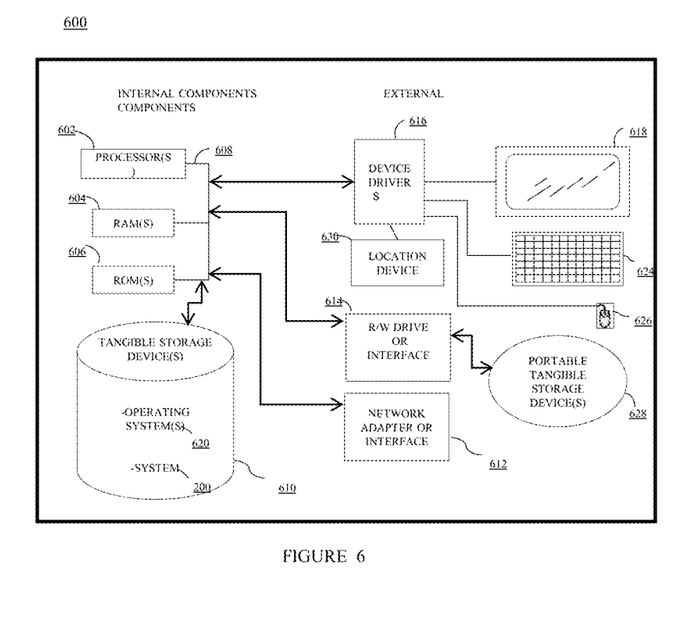
FIG. 6 illustrates a block diagram of an electronic device implemented according to an embodiment of the present disclosure.

FIG. 6 is a block diagram 600 for of a computing device utilized for implementing the system 100 of FIG. 1 and the academic search system 200 of FIG. 2 implemented according to an embodiment of the present disclosure. The modules of the system 100 described herein are implemented in computing devices. The computing device 600 comprises one or more processor 602, one or more computer-readable RAMs 604 and one or more computer-readable ROMs 606 on one or more buses 608.

Further, the computing device 600 includes a tangible storage device 610 that may be used to execute operating systems 620 and modules existing in the system 100. The various modules of the academic search system 200 can be stored in tangible storage device 610. Both, the operating system and the modules existing in the system 100 are executed by processor 602 via one or more respective RAMs 604 (which typically include cache memory).

Examples of storage devices 610 include semiconductor storage devices such as ROM 606, EPROM, flash memory, or any other computer-readable tangible storage device 610 that can store a computer program and digital information. Computing device also includes R/W drive or interface 614 to read from and write to one or more portable computer-readable tangible storage devices 628 such as a CD-ROM, DVD, and memory stick or semiconductor storage device. Further, network adapters or interfaces 612 such as a TCP/IP adapter cards, wireless WI-FI interface cards, or 3G or 4G wireless interface cards or other wired or wireless communication links are also included in computing device 600. In one embodiment, the modules existing in the system 100 can be downloaded from an external computer via a network (for example, the Internet, a local area network or other, wide area network) and network adapter or interface 612. Computing device 600 further includes device drivers 616 to interface with input and output devices. The input and output devices can include a computer display monitor 618, a keyboard 624, a keypad, a touch screen, a computer mouse 626, and/or some other suitable input device.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A system for identifying academic content relevant to each of a plurality of users, from academic content hosted by a knowledge base on a distributed database, based on one or more characters entered by the user in a search window on a user device associated with each of the plurality of users, the system comprising a processor in communication with a memory, the memory storing the knowledge base, and the processor configured for:
   a. receiving from a user device, into an academic search system, in one of near real time and real time, the one or more characters entered by each of the plurality of users to form a search query;
   b. applying a plurality of multilevel protocols on the one or more characters entered by each of the plurality of users, for retrieving a plurality of content blocks from the distributed database to the academic search system, wherein, the plurality of multilevel protocols are applied concurrently on the one or more characters entered by each of the plurality of users based on, but not limited to: a metadata associated with the node of the knowledge base and one or more elements associated with the node of the knowledge base, wherein the one or more elements include titles and description fields of one or more documents hosted by the knowledge base; and the multilevel protocol is k-level fallback protocol;
   c. assigning a score to each of the content blocks retrieved, the score being based on one or more factors, for disambiguating the retrieved content blocks;
   d. repeating the steps, a, b, and c, until the score of a content block satisfies each of one or more conditions for selecting the content block as a final content block, wherein the one or more conditions for selecting the final content block comprise: the score of the final content block being greater than the scores of all other retrieved content blocks; the score of the final content block is greater than a predetermined threshold, and the score of the final content block satisfies a predefined relationship with the scores of all the other retrieved content blocks;
   e. retrieving a node of the knowledge base from the distributed database to the academic search system associated with the final content block;
   f. retrieving the academic content hosted by the node of the knowledge base from the distributed database to the academic search system, as the academic content relevant to the user.
   g. transmitting the academic content from the academic search system to the user device; and
   h. displaying, by presenting the academic content on a user interface of the user device associated with each of the plurality of users, wherein the academic content is presented in form of an academic widget comprising one or more actionable content, wherein the actionable content comprises videos, practice question sets, assessment tests, study reference links, interactive 3D models, academic games.

2. The system as claimed in claim 1, wherein identifying intent of the search query for re-writing the search query to instantiate a set of filters prior to applying the plurality of multilevel protocols.

3. The system as claimed in claim 1, wherein the one or more factors for disambiguating the content blocks comprises, but not limited to academic context of each of the plurality of users, cohort context of each of the plurality of users, relevance of a keyword in the search query to one or more contextual elements associated with each of the plurality of users, negative weights for irrelevant keywords in the search query, time duration related context, calendar related context or combinations thereof.

4. The system as claimed in claim 1, wherein retrieving the academic content hosted by the node of the knowledge base from the distributed database to the academic search system comprises fetching a plurality of academic widgets associated with the node and its sub-nodes in a hierarchical manner.

5. The system as claimed in claim 4, comprising populating each of the plurality of academic widgets with one or more actionable content from the knowledge base.

6. The system as claimed in claim 4, comprising ranking each of the plurality of academic widgets for displaying the academic content to each of the plurality of users in descending order of rank.

7. The system as claimed in claim 1, ranking each of the one or more associated content within each of the plurality of academic widgets is ranked, the ranking being based on the one or more contextual elements of each of the plurality of users for displaying the one or more actionable content to each of the plurality of users, in descending order of rank.

8. The system as claimed in claim 1, comprising recommending each of the plurality of academic widgets to each of the plurality of users is based on the at least one user's implicit information obtained from a plurality of predetermined factors including one or more of, but not limited to, each of the plurality of user's search history and the each of plurality of user's predetermined context.

9. A computer implemented method for identifying academic content relevant to each of a plurality of users, from academic content hosted by a knowledge base on a distributed database, based on one or more characters entered by each of the plurality of users in a search window on a user device associated with each of the plurality of users, the method comprising:
   providing, by a processor, through a user interface, the academic content relevant to each of the plurality of users; wherein the processor is coupled to a memory, wherein the memory stores a plurality of modules to be executed by the processor, and wherein the plurality of modules are configured for:

a. receiving from a user device, in one of near real time and real time, the one or more characters entered by each of the plurality of users to form a search query;
b. applying a plurality of multilevel protocols on the one or more characters entered by each of the plurality of users for retrieving a plurality of content blocks from the distributed database to the academic search system, wherein, the plurality of multilevel protocols are applied concurrently on the one or more characters entered by each of the plurality of users based on, but not limited to: a metadata associated with the node of the knowledge base, and one or more elements associated with the node of the knowledge base, wherein the one or more elements include titles and description fields of one or more documents hosted by the knowledge base; and the multilevel protocol is k-level fall back protocol;
c. assigning a score to each of the content blocks retrieved, the scores being based on one or more factors, for disambiguating the retrieved content blocks;
d. repeating the steps a, b, and c, until the score of a content block satisfies each of one or more conditions for selecting the content block as a final content block, wherein the one or more conditions for selecting the final content block comprise: the score of the final content block being greater than the scores of all other retrieved content blocks; the score of the final content block is greater than a predetermined threshold, and the score of the final content block satisfies a predefined relationship with the scores of all the other retrieved content blocks;
e. retrieving a node of the knowledge base form the distributed database to the academic search system associated with the final content block;
f. retrieving the academic content hosted by the node of the knowledge base from the distributed database to the academic search system, as the academic content relevant to the each of the plurality of users;
g. transmitting the academic content from the academic search system to the user device; and
h. displaying, by presenting the academic content on a user interface of the user device associated with each of the plurality of users, in form of an academic widget comprising one or more actionable content, wherein the actionable content comprises videos, practice question sets, assessment tests, and study reference links, interactive 3D modes, academic games.

10. The method as claimed in claim 9, wherein the one or more factors for disambiguating the content blocks comprises, but not limited to academic context of the plurality of users, cohort context of the plurality of users, relevance of a keyword in the search query to one or more contextual elements associated with the plurality of users, negative weights for irrelevant keywords in the search query, time duration related context, calendar related context or combinations thereof.

11. The computer implemented method as claimed in claim 9, wherein retrieving the academic content hosted by the node of the knowledge base from the distributed database to the academic search system comprises fetching a plurality of academic widgets associated with the node and its sub-nodes in a hierarchical manner.

* * * * *